US009828843B2

(12) United States Patent
Mendell

(10) Patent No.: US 9,828,843 B2
(45) Date of Patent: Nov. 28, 2017

(54) GAS DIVERTER FOR WELL AND RESERVOIR STIMULATION

(71) Applicants: Diversion Technologies, LLC, Denver, CO (US); Highlands Natural Resources, Plc, Beckenham, Kent (GB)

(72) Inventor: Paul E. Mendell, Castle Rock, CO (US)

(73) Assignees: HIGHLANDS NATURAL RESOURCES, PLC, Beckenham, Kent (GB); DIVERSION TECHNOLOGIES, LLC, Castle Rock, CO (US)

(*) Notice: Subject to any disclaimer, the term of this patent is extended or adjusted under 35 U.S.C. 154(b) by 128 days.

(21) Appl. No.: 14/690,208

(22) Filed: Apr. 17, 2015

(65) Prior Publication Data
US 2016/0298435 A1    Oct. 13, 2016

Related U.S. Application Data

(60) Provisional application No. 62/145,439, filed on Apr. 9, 2015.

(51) Int. Cl.
E21B 43/26 (2006.01)
E21B 43/25 (2006.01)
C09K 8/62 (2006.01)
C09K 8/70 (2006.01)

(52) U.S. Cl.
CPC .............. *E21B 43/255* (2013.01); *C09K 8/62* (2013.01); *C09K 8/703* (2013.01); *E21B 43/26* (2013.01)

(58) Field of Classification Search
None
See application file for complete search history.

(56) References Cited

U.S. PATENT DOCUMENTS

| 3,100,528 A | 8/1963 | Plummer et al. |
| 3,108,636 A | 10/1963 | Peterson |
| 3,245,470 A * | 4/1966 | Henry .................. E21B 43/267 166/280.1 |

(Continued)

FOREIGN PATENT DOCUMENTS

| CA | 2528696 | 6/2006 |
| CA | 2713325 | 2/2011 |

(Continued)

OTHER PUBLICATIONS

U.S. Appl. No. 14/728,719, filed Jun. 2, 2015, Mendell.

(Continued)

*Primary Examiner* — Angela M DiTrani
(74) *Attorney, Agent, or Firm* — Sheridan Ross P.C.

(57) ABSTRACT

The disclosure provides a method of treating a subterranean formation penetrated by a wellbore. The method includes introducing a gas phase gas into fractures of the subterranean formation extending from the wellbore, followed by introducing a carrier fluid into the subterranean formation under sufficient pressure to fracture a portion of the subterranean formation and release hydrocarbons from the subterranean formation. The gas phase gas occupies the fractures at a sufficient pressure to cause the carrier fluid to be diverted to additional fractures of the subterranean formation defined by the portion.

22 Claims, 6 Drawing Sheets

(56) References Cited

U.S. PATENT DOCUMENTS

| | | | |
|---|---|---|---|
| 3,612,179 A * | 10/1971 | Anderson | C09K 8/94 |
| | | | 166/281 |
| 3,613,789 A | 10/1971 | Son, Jr. | |
| 4,129,182 A | 12/1978 | Dabbous | |
| 4,374,545 A | 2/1983 | Bullen et al. | |
| 4,480,696 A | 11/1984 | Almond et al. | |
| 4,495,995 A | 1/1985 | Chen et al. | |
| 4,554,082 A | 11/1985 | Holtmyer et al. | |
| 4,938,286 A | 7/1990 | Jennings, Jr. | |
| 5,133,407 A | 7/1992 | Deines et al. | |
| 5,238,067 A | 8/1993 | Jennings, Jr. | |
| 5,529,122 A | 6/1996 | Thach | |
| 6,257,334 B1 | 7/2001 | Cyr et al. | |
| 6,367,548 B1 | 4/2002 | Purvis et al. | |
| 7,117,943 B2 | 10/2006 | Harris et al. | |
| 7,249,633 B2 | 7/2007 | Ravensbergen et al. | |
| 7,766,083 B2 | 8/2010 | Willett et al. | |
| 8,905,133 B2 | 12/2014 | Potapenko et al. | |
| 8,905,136 B2 | 12/2014 | Todd et al. | |
| 2002/0007949 A1* | 1/2002 | Tolman | E21B 33/124 |
| | | | 166/308.1 |
| 2005/0020454 A1* | 1/2005 | Francini | C09K 8/72 |
| | | | 507/203 |
| 2005/0124500 A1 | 6/2005 | Chen et al. | |
| 2006/0124309 A1 | 6/2006 | Nguyen et al. | |
| 2007/0000666 A1 | 1/2007 | Vozniak et al. | |
| 2007/0295499 A1 | 12/2007 | Arthur et al. | |
| 2010/0200235 A1 | 8/2010 | Luo et al. | |
| 2010/0212906 A1 | 8/2010 | Fulton et al. | |
| 2011/0005761 A1 | 1/2011 | Luo et al. | |
| 2011/0048708 A1 | 3/2011 | Glasbergen et al. | |
| 2013/0146293 A1 | 6/2013 | Zazovsky et al. | |
| 2013/0341025 A1 | 12/2013 | Gupta | |
| 2014/0096950 A1 | 4/2014 | Pyecroft et al. | |
| 2014/0166280 A1 | 6/2014 | Stone et al. | |
| 2014/0174739 A1 | 6/2014 | Bourcier et al. | |
| 2014/0251626 A1 | 9/2014 | Gomaa et al. | |
| 2014/0299326 A1 | 10/2014 | Crews | |
| 2014/0318793 A1 | 10/2014 | van Petergem et al. | |
| 2014/0371114 A1 | 12/2014 | Todd et al. | |
| 2014/0374108 A1 | 12/2014 | Vandeponseele et al. | |

FOREIGN PATENT DOCUMENTS

| CA | 2893909 | 10/2016 |
|---|---|---|
| WO | 2014/065973 A1 | 5/2014 |

OTHER PUBLICATIONS

U.S. Appl. No. 14/957,182, filed Dec. 2, 2015, Mendell.
"Is using nitrogen for water-free fracking the way forward?," Shale Gas International, 2014, 5 pages.
"MistFracsm Service," Halliburton Communications, 2005, 2 pages.
Freeman, "A Stimulation Technique Using Only Nitrogen," Society of Petroleum Engineers, SPE-10129-PA, 1983, 2 pages, abstract only.
Grundmann et al., "Cryogenic Nitrogen as a Hydraulic Fracturing Fluid in the Devonian Shale," Society of Petroleum Engineers, SPE-51067-MS, 1998, 2 pages, abstract only.
Gurule, "Nitrogen gas fracking," Frackwire, 2013, 5 pages.

Kennedy et al., "Case Study on the Effectiveness of Nitrogen Foams and Water Zone Diverting Agents in Multistage Matrix Acid Treatments," Society of Petroleum Engineers, SPE-20621-PA, 1992, 2 pages, abstract only.
Li et al., "Chemical Additives and Foam to Enhance SAGD Performance," Society of Petroleum Engineers, SPE-174489-MS, 2015, 2 pages, abstract only.
Little, "Nitrogen-heavy gas drilling method common in Tenn.," Knoxville News Sentinel, 2010, 6 pages.
Morgenthaler et al., "Model Wellbore Evaluation of Diverter Effectiveness Confirmed by Field Results," Society of Petroleum Engineers, SPE-31140-MS, 1996, 2 pages, abstract only.
Parton et al., "Long Interval Foamed Diversion Treatment: A Mid-Scale Multizone Diversion Treatment Study," Society of Petroleum Engineers, SPE-174247-MS, 2015, 2 pages, abstract only.
Presley, "Energized fracturing comes to the Bakken," EP Magazine, 2015, 1 page.
Vincent et al., "Refracs—Why Do They Work, And Why Do They Fail In 100 Published Field Studies?," Society of Petroleum Engineers, SPE 134330-MS, 2010, 2 pages, abstract only.
Vincent, "Restimulation of Unconventional Reservoirs: When are Refracs Beneficial?," Society of Petroleum Engineers, SPE-136757-MS, 2010, 2 pages, abstract only.
Watts, "Waterless fracking promises more energy, less trouble," Watts Up With That?, 2014, 2 pages.
International Search Report and Written Opinion for International (PCT) Patent Application No. PCT/US2015/027301, dated Jul. 10, 2015, 9 pages.
International Search Report and Written Opinion for International (PCT) Patent Application No. PCT/IB2015/002469, dated Mar. 30, 2016, 11 pages.
Official Action for Great Britain Patent Application No. 1508229.0, dated May 26, 2015, 2 pages.
Search Report for Great Britain Patent Application No. 1508229.0, dated Jun. 18, 2015, 5 pages.
Official Action for Great Britain Patent Application No. 1522493.4, dated Dec. 31, 2015, 2 pages.
Search Report for Great Britain Patent Application No. 1522493.4, dated Feb. 26, 2016, 5 pages.
International Search Report and Written Opinion for International (PCT) Patent Application No. PCT/IB2016/063354, dated Feb. 15, 2017, 13 pages.
Official Action for U.S. Appl. No. 14/728,719, dated Dec. 21, 2016, 20 pages.
Official Action for U.S. Appl. No. 14/957,182, dated Dec. 23, 2016, 25 pages.
Official Action for U.S. Appl. No. 15/197,384, dated Feb. 2, 2017, 27 pages.
Notice of Allowance for U.S. Appl. No. 15/197,384, dated Mar. 8, 2017 26 pages.
International Search Report and Written Opinion for International (PCT) Patent Application No. PCT/US17/26089, dated Jun. 20, 2017, 6 pages.
Final Action for U.S. Appl. No. 14/728,719, dated Apr. 3, 2017, 9 pages.
Notice of Allowance for U.S. Appl. No. 14/728,719, dated May 17, 2017, 7 pages.
Final Action for U.S. Appl. No. 14/957,182, dated Apr. 12, 2017, 50 pages.
Final Action for U.S. Appl. No. 14/728,719, dated Apr. 3, 2017, 9 paces.

* cited by examiner

GAS DIVERTER FOR WELL AND RESERVOIR STIMULATION

CROSS REFERENCE TO RELATED APPLICATIONS

The present application claims priority under 35 U.S.C. §119 to U.S. Provisional Patent Application 62/145,439, which was filed Apr. 9, 2015, entitled "GAS DIVERTER FOR WELL AND RESERVOIR STIMULATION," and is hereby incorporated by reference in its entirety into the present application.

TECHNICAL FIELD

Aspects of the presently disclosed technology relate to diverter systems and in particular involve gas diverter systems.

BACKGROUND

Oil and gas wells are stimulated and re-stimulated in various ways to increase production of a flow of hydrocarbons from a completed well. With a newly completed well with a large reservoir and easily captured hydrocarbons, for example, the well may not require much or any stimulation techniques to produce an adequate flow of hydrocarbons from the well. Other wells, depending on composition or otherwise, may require more well stimulation to release the hydrocarbons from the subterranean formation containing the hydrocarbons.

In recent years, hydraulic fracturing has become a widely-used well stimulation technique to increase well production and access previously uncaptured hydrocarbons. Hydraulic fracturing involves hydraulically fracturing the subterranean formation with a pressurized liquid or carrier liquid, containing water, proppant (e.g., sand or man-made alternative), and/or chemicals, that is injected into a wellbore. Upon pressurizing the wellbore with the carrier liquid, the formation fractures or cracks and the carrier fluid can leave behind proppant, which allows the hydrocarbons to flow more freely through the fractures and into the wellbore to be recovered. In some instances, a downhole electric submersible pump may pump the hydrocarbons from the reservoir to overcome the hydrostatic head pressure of the hydrocarbons, or the hydrocarbons may flow freely up the wellbore without assistance.

As seen in FIG. 1, which is a side view of a horizontal drilling operation 100 utilizing hydraulic fracturing, a pressurized liquid 102 may cause multiple fractures 104 within the subterranean formation 106. Fractures 104 formed by the pressurized liquid 102 can be of varying sizes. Accordingly, larger fractures or pore volumes 108 may cause a lower stress zone 110 within the formation such that upon stimulation and re-stimulation of the well the carrier liquid 102 tends to concentrate in these lower stress zones 110. These lower stress zones 110 can be caused by hydrocarbon depletion, lower pore pressure, and/or higher permeability of the reservoir 106. Permeability of the reservoir can, in part, depend on the extensiveness of fractures and/or pores, and the interconnectivity of the fractures and/or pores that create pathways for hydrocarbons to flow. As a result of the lower stress zones, the hydrocarbons are more likely to flow through these larger fractures or pore volumes 108, and/or those with interconnectivity, until depletion. The fractures and/or pore volumes 104 of finer sizes 112 and/or those lacking interconnectivity tend to be concentrated in higher stress zones 114 such that the carrier liquid 102 is less likely to effectively hydraulically fracture those higher stress zones and thus influence the flow of hyrdrocarbons in these regions upon stimulation or re-stimulation. This is in part, because the pressure of the carrier liquid 102 is generally evenly distributed along the wellbore in the treated area such that the carrier liquid 102 remains concentrated in the lower stress zones 110 rather than the higher stress zones 114. The higher stress zones 114, in contrast to the lower stress zones 110, can be caused by higher pore pressure, ineffective hydraulically fractured regions, lower permeability of the reservoir 106, or generally less depleted portions of the reservoir 106. As such, the carrier liquid 102 tends to not affect the higher stress zones 114, which may contain hydrocarbons, unless additional systems and methods are employed.

In subsequent well treatments or in initial well treatments, diverter systems may be used to divert the carrier liquid 102 from the lower stress zones 110, which may be depleted from previous treatments, to the previously un-accessed, higher stress zones 114. Diverting the carrier liquid 102 into these higher stress zones 114 may be difficult over large areas of the wellbore and reservoir for a number of reasons. In new wells, the difficulty may be due to differences in stresses from different lithologies or from different reservoir characteristics along the well. Differences in stress can be due to natural in-situ stress conditions or man-made activities such as well stimulation or depletion of fluids. In previously stimulated wells, the difficulty may be due to adequately blocking the fractures and/or pore volume 108 in the lower stress zones 110 such that the carrier liquid 102 pressurizes the fractures 112 of the higher stress zones 114. Diverter systems include the use of particulates (e.g., polymers) and chemical diverters within the carrier liquid 102, among other methods, to block either the wellbore or the formation near the wellbore so that a portion of the carrier liquid 102 may be diverted to the fractures 112 in the higher stress zones 114 and also create new fractures in the higher stress zones.

SUMMARY

Aspects of the present disclosure involve a method of treating a subterranean formation penetrated by a wellbore. The method includes introducing a composition including a gas into features of the subterranean formation extending from the wellbore. The features including fractures or pore volumes. This step is followed by introducing a carrier fluid into the subterranean formation under sufficient pressure to fracture a portion of the subterranean formation and release hydrocarbons from the subterranean formation. The gas may occupy the features at a sufficient pressure to cause the carrier fluid to be diverted to additional features of the subterranean formation defined by the portion. The additional features may include additional fractures or pore volumes.

Aspects of the present disclosure may also involve a method of treating a subterranean formation penetrated by a wellbore. The method includes introducing a diverting composition consisting of a gas into a wellbore and into fractures or pore volumes of the subterranean formation extending from the wellbore and introducing a carrier fluid into the subterranean formation, the gas being sufficiently pressurized within the fractures or pore volumes to cause the carrier fluid to pressurize additional fractures or pore volumes within the subterranean formation.

Aspects of the present disclosure may also involve a method of treating a subterranean formation penetrated by a wellbore. The method includes introducing a diverting composition including a foam mixture of gas and liquid into features of the subterranean formation extending from the wellbore. The features may include fractures or pore volumes. The method may additionally include introducing a carrier fluid into the subterranean formation under sufficient pressure to fracture a portion of the subterranean formation and release hydrocarbons from the subterranean formation. The foam mixture may occupy the features at a sufficient pressure to cause the carrier fluid to be diverted to additional features of the subterranean formation defined by the portion. The additional features may include additional fractures or pore volumes.

Aspects of the present disclosure may also involve a method of treating a subterranean formation penetrated by a wellbore. The method may include introducing a composition including a substantially compressible substance into features of the subterranean formation extending from the wellbore. The features may include fractures or pore volumes. The method may additionally include introducing a substantially incompressible substance into the subterranean formation under sufficient pressure to fracture a portion of the subterranean formation and release hydrocarbons from the subterranean formation. The substantially compressible substance may occupy the features at a sufficient pressure to cause the substantially incompressible substance to be diverted to additional features of the subterranean formation defined by the portion. The additional features may include additional fractures and pore volumes.

DETAILED DESCRIPTION

Aspects of the presently disclosed technology involve a diversion technique for use in vertical, deviated, or horizontal wells undergoing a stimulation process (e.g., initial stimulation or re-stimulation) to divert a carrier liquid from treating previously stimulated areas (i.e., lower stress zones of the formation) and to force the carrier liquid to treat previously unstimulated areas (i.e., higher stress zones of the formation). The methods disclosed provide cost-effective means for improving the well production. After a wellbore is drilled and completed, stimulation operations are usually performed to enhance hydrocarbon (e.g. gas, oil, etc.) production into the wellbore and to enhance extraction of the hydrocarbons from the subterranean formation. Current diversion techniques use liquid or solid forms, such as chemical solutions (e.g., a borate solution) or, particulates (e.g., polymers spheres), which can be costly and potentially ineffective in diverting fluid to the higher stress regions/zones of the reservoir. Additionally, liquid- and solid-form diverters can be problematic as they leave residue that can damage the subterranean formation and can lead to inhibited production from the well. In contrast, the methods of the present disclosure are cost effective, operationally feasible based on current equipment available to the industry, and can enhance the rate of extraction of the hydrocarbons. In particular, the use of a gas as the diversion medium allows for greater filling of the reservoir in lower stress zones such that a carrier liquid can be more efficiently diverted to the higher stress zones of the reservoir. The use of a gas as the diversion medium also has advantages in that no residue remains and the gas can be recovered during flowback. In certain instances, the gas may be recovered during flowback can be reused, recycled, or marketed.

Figure 1:
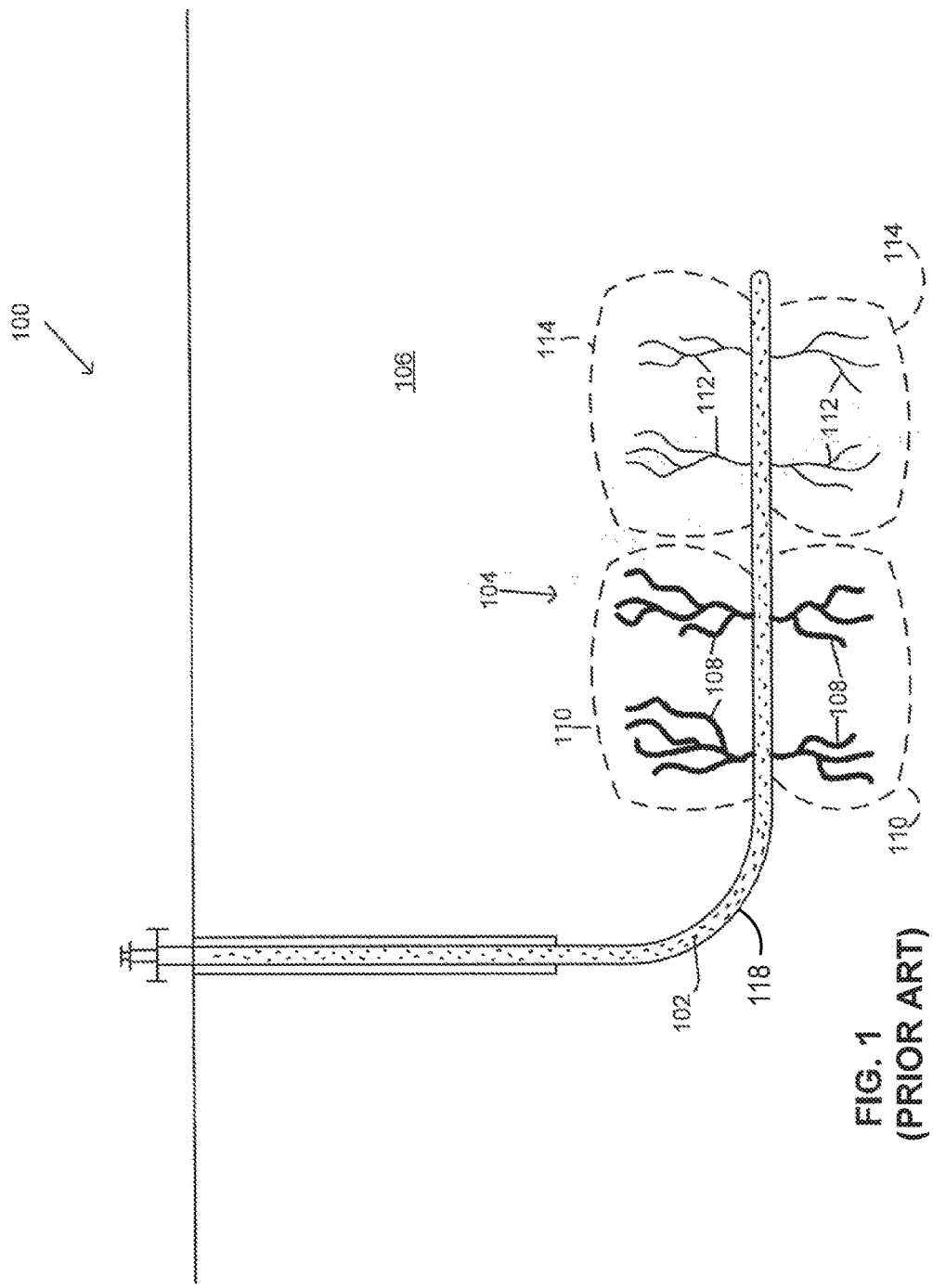
FIG. 1 is a side view of a hydraulic fracturing operation showing high and low stress zones.
Figure 2:
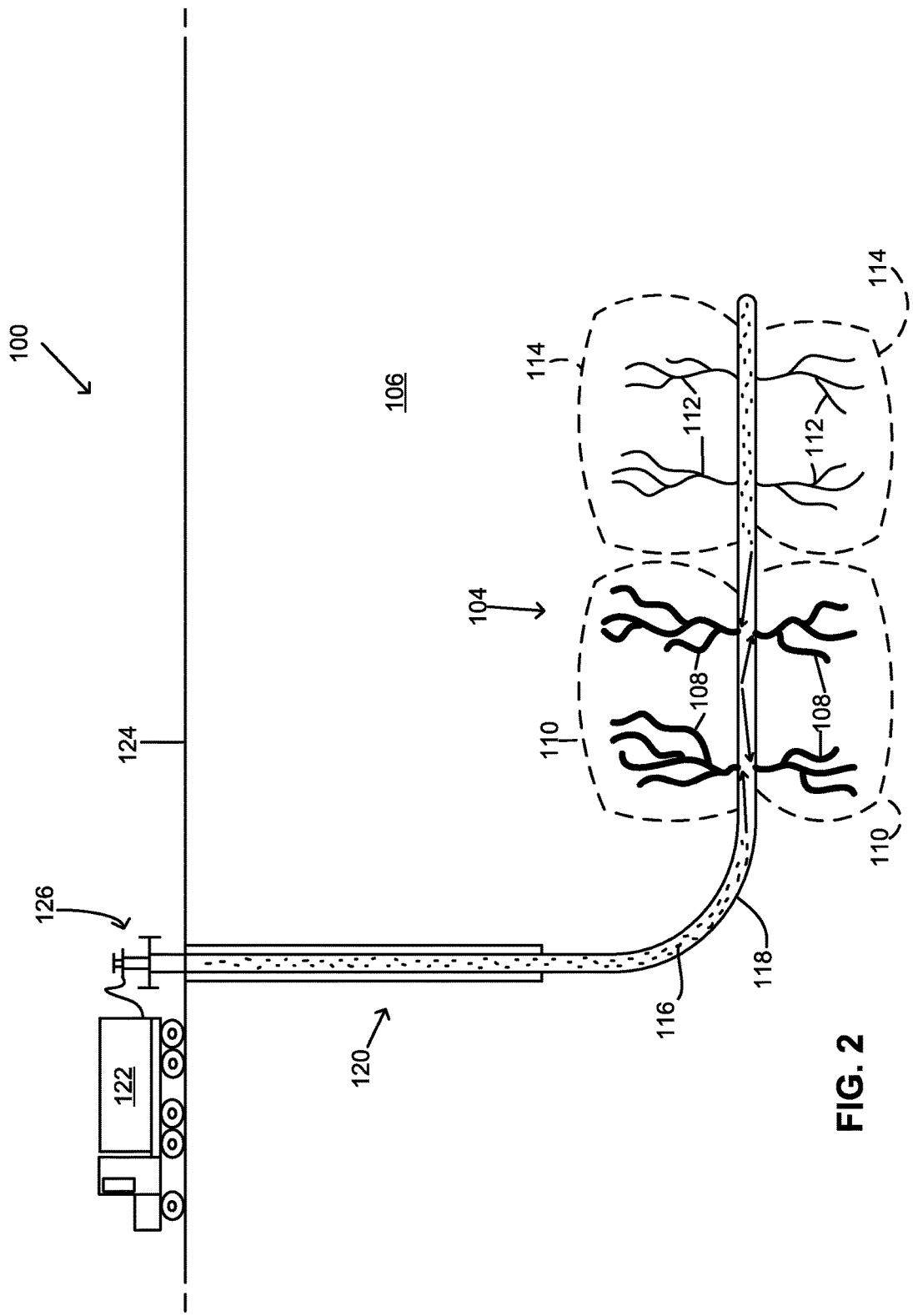
FIG. 2 is a side view of a horizontal drilling operation utilizing the diversion technique described herein where a gas is introduced into the well.

More particularly, and as seen in FIG. 2, which is a side view of a horizontal drilling operation 100 utilizing the diversion technique described herein, a first step in the diversion technique includes injecting a gas 116 into a wellbore 118 of a well 120 to pressurize the fractures 108 in the lower stress zones 110 of the subterranean formation 106 and the reservoir. In certain implementations, the gas 116 may be in a liquid phase, a gas phase, or a foam mixture of gas and a liquid. The gas is introduced to infiltrate the formation 106 and the reservoir holding the hydrocarbons. The gas can travel through a stimulation network of fractures and/or pore volumes (i.e., man-made or naturally occurring). Upon infiltration, the gas will occupy pore volumes and existing fractures in the formation 106. In some instances, the pore volume can be preexisting from the natural formation or areas/regions of hydrocarbon depletion. This gas infiltration creates a barrier for a carrier liquid 102 that is subsequently delivered into the wellbore and diverted to the higher stress zones 114. The gas in the stimulation network can build a sufficient pressure in the network allowing subsequently delivered carrier fluid or liquid to be diverted into previously untreated areas of the formation. In some instances, this method will allow for the diversion of a fluid or liquid to a portion of the formation that is a significant distance from the wellbore (i.e. far-field).

The subterranean formation may include one or more of any type of rocks, such as sedimentary rocks like sandstone, limestone, and shale; igneous rocks like granite and andesite; or metamorphic rocks like gneiss, slate, marble, schist, and quartzite. In certain implementations, the subterranean formation may be a shale formation, a clay formation, a sandstone formation, a limestone formation, a carbonate formation, a granite formation, a marble formation, a coal bed, or combinations thereof.

Figure 3:
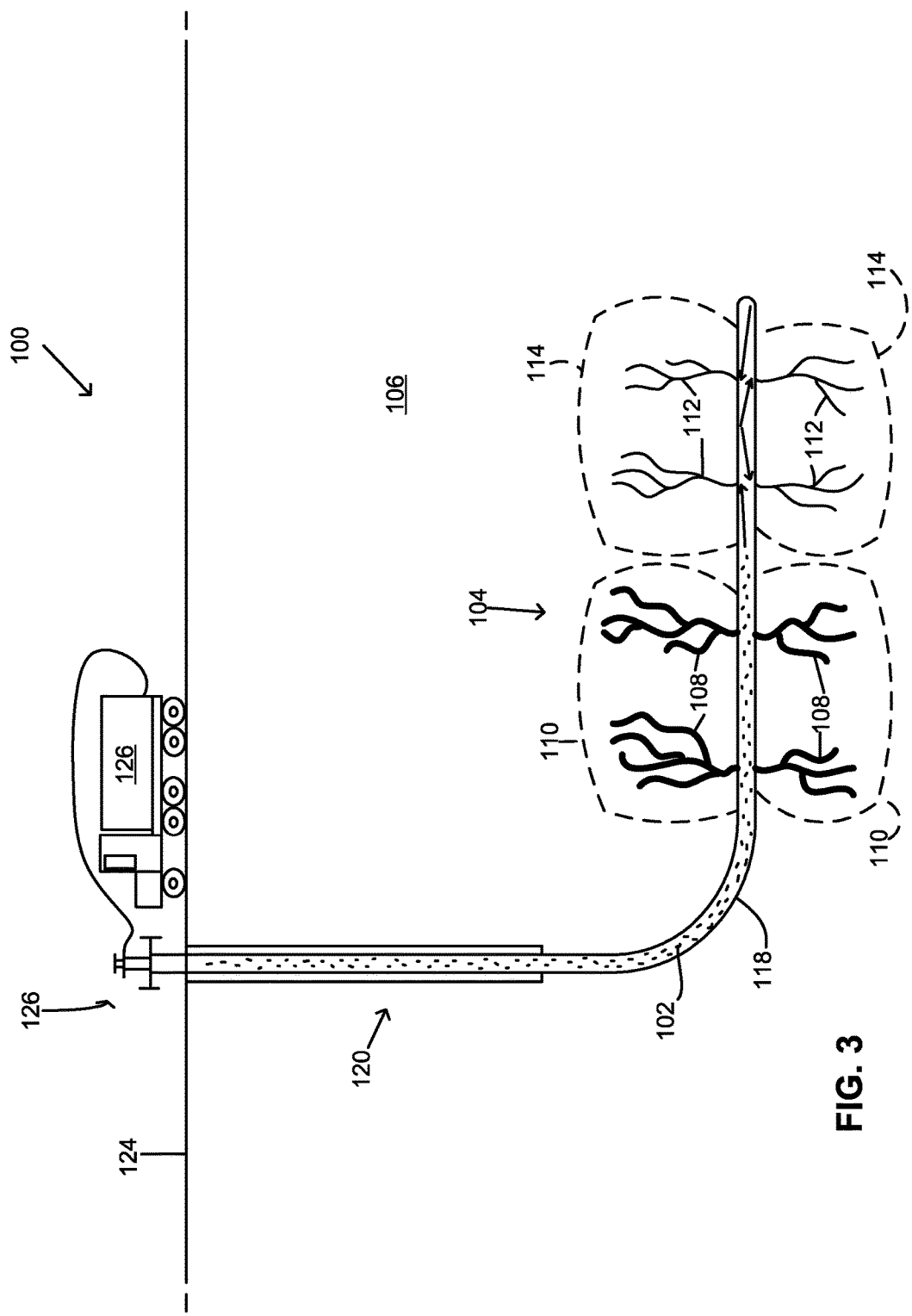
FIG. 3 is a side view of the horizontal drilling operation utilizing the diversion technique described herein where a carrier liquid is introduced into the well.

As seen in FIG. 3, which is a side view of the horizontal drilling operation 100 utilizing the diversion techniques described herein, a second step in the diversion technique includes injecting the carrier liquid 102 into the wellbore 118 such that the carrier liquid 102 pressurizes and fractures additional fractures 112 of the formation 106 that were previously not stimulated. Without injecting the gas 116 into the wellbore, the carrier liquid 102 would not be diverted to untreated areas and would otherwise infiltrate the fractures 108 of the lower stress zone 110. Sufficiently pressurizing the fractures 108 in the lower stress zone 110 causes the subsequently injected carrier liquid 102 to bypass the gas-filled, pressurized fractures 108 in the lower stress zones 100 and can be directed to infiltrating the fractures 112 of the high stress zone 114 or create new fractures.

The gas 116 may be delivered through a wellhead 126 of the well 120. In some embodiments, the gas 116 may be delivered via a storage truck 122 positioned on the ground 124 near the wellhead 126. In other embodiments, the gas 116 may be delivered via pipeline, a storage tank, other gas producing wells, or other suitable supply sources.

Factors effecting the volume of gas 116 to be introduced in the well 120 include the size of the depleted regions of the reservoir (including pore volume and fractures), leak off rate of the gas 116, and the extent of existing fracture and reservoir conditions (e.g. reservoir pressure—if the pressure is high it will compress the gas or foam requiring more volume to occupy the fractures/pore volumes).

For instance, in some embodiments, the volume of the gas can range from about 1000 standard cubic feet (scf) to about 100,000,000 scf or greater. In various embodiments, the gas can be injected at rates within a range of about 30 scf/min to about 500,000 scf/min. In some embodiments, the gas can be injected at a rate of about 10,000 to about 20,000 scf/min.

In certain instances, the gas 116 may be injected into the well over an extended period of time. For example, the gas 116 may be injected over a period of time that can be minutes, hours, days, or months, depending on a number of factors. In some embodiments, the gas 116 may be injected over a period of time of at least 2 hrs. In other embodiments, the gas 116 may be injected over a period of time of at least a day. For example, in certain instances, the gas 116 may be injected into the well from a neighboring natural gas well, for example. A worker may check the pressure at a subsequent time (e.g., days later) and determine that, in order to meet a desired pressure within the wellbore, additional gas 116 may need to be injected into the wellbore and continue the injection of the gas. A subsequent check of the pressure (e.g., days later), may indicate that the pressure is sufficient for the introduction of the carrier liquid 102. Thus, in this example, it is possible for weeks to go by with intermittent addition of gas 116 into the well before a sufficient pressure is reached to begin introduction of the carrier liquid 102.

The gas 116 may include any number of gasses and may include nitrogen, hydrogen, methane, ethane, propane, butane, carbon dioxide, any inert gas, or any combinations thereof. The gas 116 may be deployed into the well 120 in a number of ways and in various phases. In certain implementations, the gas 116 may be in a gas phase and pumped directly into the wellbore 118 from the wellhead 126. In other implementations, the gas 116 may be in a liquid phase above ground 124, and the gas 116 is heated sufficiently at the surface for the gas 116 to enter the gas phase as it is being introduced into the wellbore 118, thereby being in the gas phase when it infiltrates the pore volumes and/or fractures. In yet other implementations, the gas may be in a liquid phase when it is introduced to the wellbore. The gas in the liquid phase may be pumped into the well and allowed to remain in the well 120 for a sufficient amount of time such that the reservoir temperature causes the liquid phase gas 116 to change phases from a liquid to a gas and infiltrate the fractures and pore volumes 108. For example, the reservoir temperature may range from 120 degrees Fahrenheit (F) to greater than 600 degrees F. The gas 116 in a liquid phase may be pumped into the well at a lower temperature (e.g., −69° F. to 80° F.), and through heat exchange from the higher temperature of the well, can transition from the liquid phase to a gas phase.

In certain implementations, a foam mixture of liquid and gas may be pumped into the well 120, instead of gas 116. The foam may be delivered through a wellhead of the well. In some embodiments, the foam may be delivered via a storage truck 122 positioned on the ground 124 near the wellhead 126. In other embodiments, the gas 116 may be delivered via pipeline, a storage tank, or other suitable supply sources.

Foam quality is conventionally defined as the volume percent gas within foam at a specified pressure and temperature. In certain instances, the quality of the foam may be at least 30. That is, there is at least 30% gas in the foam and the balance is liquid. In certain instances, the quality of the foam may be at least 40. That is, there is at least 40% gas in the foam and the balance is liquid. In certain instances, the quality of the foam may be at least 50. That is, there is at least 50% gas in the foam and the balance is liquid. In certain instances, the quality of the foam may be at least 60. That is, there is at least 60% gas in the foam and the balance is liquid. In certain instances, the quality of the foam may be greater than 70. In certain instances, the quality of the foam may be greater than 80. In certain instances, the quality of the foam may be greater than 90.

A first step in the diversion technique includes injecting a gas 116 into a wellbore 118 of a well 120 to pressurize the fractures and/or pore volumes 108 in the lower stress zones 110 of the subterranean formation 106 and the reservoir. The gas 116 is introduced to infiltrate the formation 106 and the reservoir holding the hydrocarbons. The gas 116 can travel through a stimulation network of fractures and/or pore volume (manmade or naturally occurring) extending from the wellbore 118. Upon infiltration, the gas 116 will occupy pore volumes and existing fractures in the formation 106. In some instances, the pore volume and fractures 108 can be preexisting from the natural formation or areas/regions of hydrocarbon depletion. This gas 116 infiltration creates a barrier for a carrier liquid 102 that is subsequently delivered into the wellbore 118 and diverted to the higher stress zones 114. The gas 116 in the stimulation network will build a sufficient pressure, allowing subsequently delivered carrier fluid or liquid 102 to be diverted into previously untreated areas of the formation.

In all implementations, the gas 116 or foam may infiltrate the fractures and pore volumes of the formation beyond the wellbore of the well 120 to a distance that is substantial or far-field from the wellbore, outside of a perforation tunnel, or outside of a formation face in open hole. The gas or foam 116 can infiltrate the fractures and/or pore volumes extending through the length of the well and throughout the reservoir, including far-field areas. This is an advantage of the gas and foam 116 that typical chemical and particulate diverter systems do not have. As an example, in certain implementations, far-field areas of the formation may be about 10 feet to about 3000 feet from a wellbore or perforation tunnel. In other implementations, far-field areas of the formation may be about 100 feet to about 5,000 feet from a wellbore or perforation tunnel.

As illustrated in FIG. 3, the carrier liquid 102 may be delivered through the wellhead 126. In some embodiments, the carrier liquid 102 may be delivered to the well 120 via a storage truck 126 positioned on the ground 124 near the well head 126. In certain implementations, the carrier liquid 102 or an amount of water used in the carrier liquid 102 may be supplied by storage tanks, naturally formed features (e.g., spring), a pipeline, etc.

The carrier liquid 102 may be: slick-water, which is a water-based fluid and proppant combination of a low viscosity; a gel (e.g., borate, HPG, CMHPG, CMC); or a foam (e.g., nitrogen and water with gel, carbon dioxide, propane, and combinations thereof), among other carrier liquids.

In the implementations described herein, the gas 116 may be substantially compressible within the wellbore and the reservoir, whereas the carrier liquid 102 may be substantially incompressible. The gas 116, as compared with the carrier liquid 102, tends to more easily fill the fractures and pore volumes because of its compressible nature, has a high relative permeability to the reservoir, and has a lower coefficient of friction, which allows it to fill the fractures and pore volumes that may not otherwise be penetrated by the carrier liquid 102. The carrier liquid 102, on the other hand, can more readily, as compared with the gas 116, fracture the formation of the reservoir, in part, because it is substantially incompressible.

Figure 4:
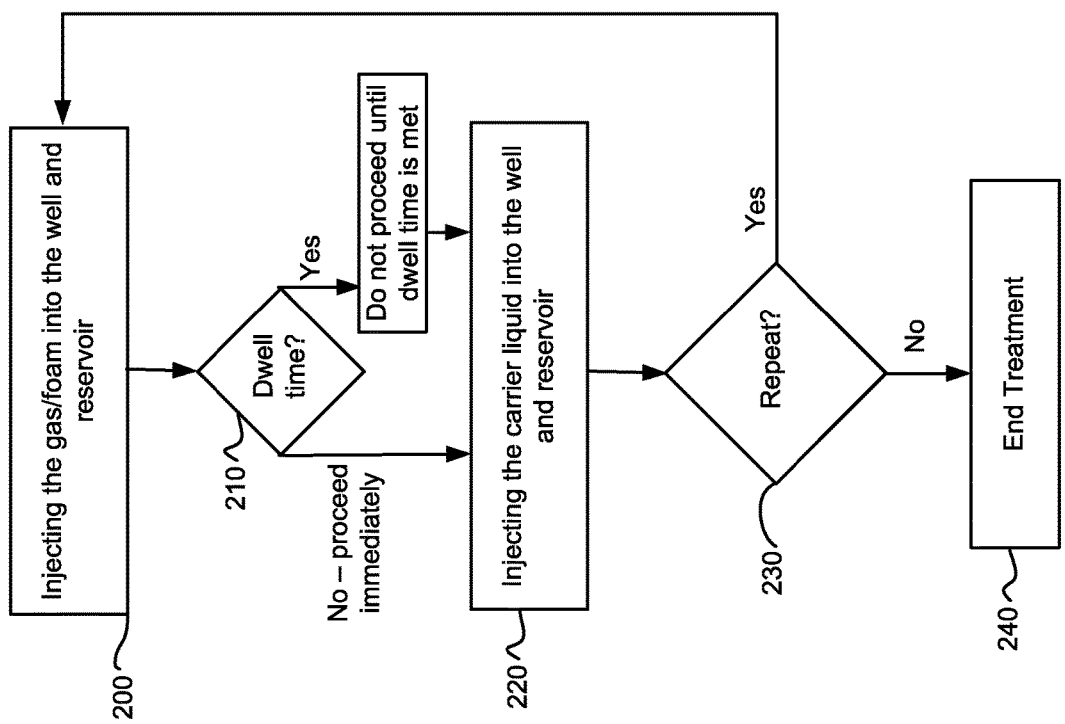
FIG. 4 is a flowchart illustrating the steps in utilizing the diversion technique described herein.

In operation, as seen in the flow chart of FIG. 4, a first step 200 in the method is injecting the gas or foam 116 into the well 120 and reservoir. As stated previously, the gas or foam 116 is configured to pressurize the fractures and pore volumes 108 in the low stress zone 110. This step 200 may include initially introducing the gas 116 into the well 120 by, for example, signaling the storage truck, tanker, or pipeline, among supply sources, 122 containing the gas 116 to begin pumping the gas 116 into the well 120 via the wellhead 126. Also included in this step 200 may be the halting the flow of gas 116 into the well 120 by, for example, signaling the storage truck 122 to stop the flow of gas 116. In other embodiments, the flow of the gas 116 can be monitored and controlled via a control system that may include pressure sensors, gauges or switches.

In some embodiments, step 200 can comprise injection of gas using a continuous flow until the desired volume has been injected. In other embodiments, step 200 can comprise injecting the gas intermittently, in which the flow of the gas can be started, stopped, and started again, and stopped again in succession. In such embodiments, the flow of gas can be started and stopped any number of times until the desired volume has been injected.

As stated previously, this step 200 may take place over a period of minutes, hours, days, or weeks depending on the well and the type and availability of the diverting agent. In certain instances, the step 200 of injecting the well 120 with gas or foam 116 may take a period of hours until a desired pressure is reached within the well 120. Alternatively, in other implementations, gas or foam 116 may be injected into the well 120 and it may take a period of weeks for sufficient pressure to be reached in the well 120 to begin injecting the carrier liquid 102. And, over the period of weeks, gas or foam 116 may be added continuously, intermittently, or otherwise.

Next, step 210 includes allowing the gas or foam 116 to remain in the well 120 and reservoir for a chosen dwell time, if appropriate, given the chosen deployment method. For example, with certain deployment methods, the gas or foam 116 may be required to remain in the well 120 and reservoir for a period of time before the carrier liquid 102 can be injected into the well 120. For example, if the gas 116 is in a gas phase, there may not be a dwell time. That is, the carrier liquid 220 may be injected immediately upon halting of the flow of gas 116 into the well 120. If the gas 116 is in the liquid phase and the gas will be heated into the gas phase by the heat/energy from the well 120 and reservoir, for example, the gas or foam 116 may need to remain in the well 120 for a dwell time of about 5 minutes to about 24 hours. In certain instances, the dwell time may be longer or shorter. In some embodiments, the dwell time can be less than twenty-four hours. In some embodiments, the dwell time can be less than one hour. In some embodiments, the dwell time can be less than thirty minutes. In other embodiments, the dwell time can be more than twenty four hours Continuing on, the next step 220 in the method is injecting the carrier liquid 102 into the well 120 and reservoir. This step 220 may include initially introducing the carrier liquid 102 into the well 120 by, for example, signaling the storage truck or other supply source 126 containing the carrier liquid 102 to begin pumping the carrier liquid 102 into the well 120 via the wellhead 126. Also included in this step 220 may be halting the flow of carrier liquid 102 into the well 120 by, for example, signaling the storage truck, or supply source 122 to stop the flow of carrier liquid 102. Carrier liquid 102 can be injected at rates of about 2 barrels/minute (bbl/min.) (84 gallons/min.) to greater than 200 bbl/min. (8400 gallons/min).

The next step 230 asks if the previous operations will be repeated. If the well 120 requires additional treatment, for example, to divert the flow of carrier liquid 102 from additional low stress zones 110 that were formed from the previous operations to newer high stress zones 114 for fracturing. Criteria indicating the need for a re-treatment may, for example, be if the carrier liquid 102 experiences a high pressure, which may indicate the presence of a higher stress zone that may potentially fracture. On the other hand, lower pressure in the well 120 may indicate the carrier fluid 102 is infiltrating lower stress zones. In this situation, the operations may be repeated or ended depending on the particulars of the situation. If the operation is to be repeated, gas 116 may be re-injected into the well 120 and reservoir for additional treatment as described previously with respect to step 200 of the method. The entire cycle of steps 200, 210, and 220 may be repeated any number of times until the end of treatment, at step 240. The methods as described herein can be used to stimulate or treat vertical, deviated, or horizontal wells.

Figure 5:
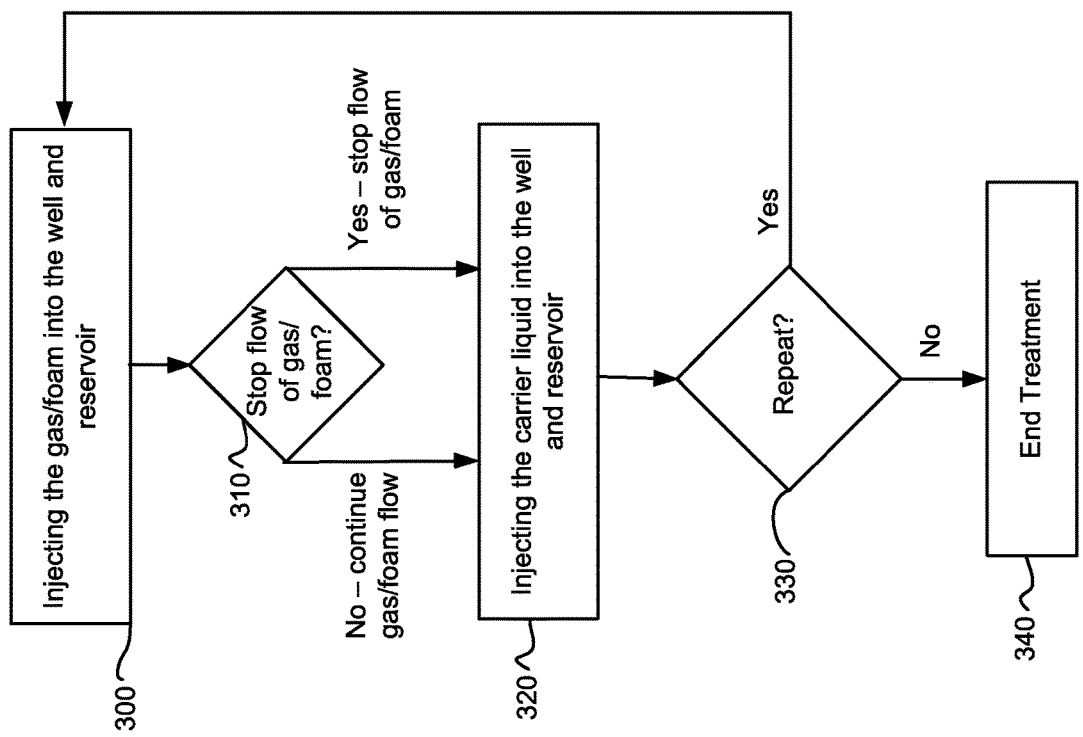
FIG. 5 is a flowchart illustrating another set of steps in utilizing the diversion technique described herein.

Reference is now made to the flowchart of FIG. 5. As seen in the figure, a first step 300 of the method includes injecting the gas or foam 116 into the well 120 and reservoir. The next step 310 asks whether the flow of gas or foam 116 will be stopped before the carrier liquid 102 is injected into the well 120 and reservoir. In certain implementations, the flow of gas or foam 116 may stop and the carrier liquid 102 may be subsequently injected into the well 120, as was shown in FIG. 4. In other implementations, the flow of gas or foam 116 may continue or not be stopped. In these implementations, the carrier liquid 102 may be injected into the well 120 at step 320 while the foam or gas 116 is also or simultaneously flowing into the well 120. Next, the previous steps 300, 310, 320 may be repeated, if desired. The treatment may be ended at step 340.

Figure 6:
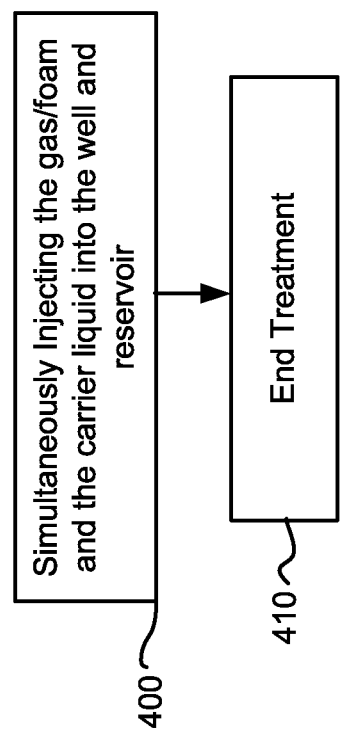
FIG. 6 is a flowchart illustrating yet another set of steps in utilizing the diversion technique described herein.

Turning to the flowchart of FIG. 6, at step 400, the gas or foam 116 and the carrier liquid 102 may be simultaneously injected into the well 120 and reservoir without any previous injections of the gas or foam 116 into the well 120. The gas or foam 116 and the carrier liquid 102 may be connected at the wellhead 126 to be delivered downhole. The gas or foam 116 may mix with the carrier liquid 102 at the wellhead 126 or within the wellbore 118. This step 400 may continue until the end of treatment at step 410.

Various modifications and additions can be made to the exemplary embodiments discussed without departing from the spirit and scope of the presently disclosed technology. For example, while the embodiments described above refer to particular features, the scope of this disclosure also includes embodiments having different combinations of features and embodiments that do not include all of the described features. Accordingly, the scope of the presently disclosed technology is intended to embrace all such alternatives, modifications, and variations together with all equivalents thereof.

What is claimed is:

1. A method of treating a subterranean formation, the method comprising:
   a) introducing a gas phase diverting composition consisting of a gas into features of the subterranean formation extending from a wellbore, the features comprising fractures or pore volumes, to pressurize and inhibit fracturing of the features;
   b) allowing the gas to dwell in the subterranean formation for less than one hour; followed by,
   c) introducing a carrier fluid into the subterranean formation under sufficient pressure to fracture a portion of the subterranean formation and release hydrocarbons from the subterranean formation, wherein the carrier fluid comprises a proppant and wherein a portion of the gas in the diverting composition occupies the pressurized features at a sufficient pressure to cause the carrier fluid to be diverted to fracture additional features of the subterranean formation defined by the portion to form additional fractures or pore volumes and wherein pressurization of the features by the gas phase diverting composition creates a barrier to the carrier fluid and substantially inhibits fracturing of the pressurized features by the carrier fluid.

2. The method of claim 1, wherein the gas comprises an inert gas, wherein the pressurized features are previously stimulated areas, wherein an injection rate of the gas into the wellbore in (a) ranges from about 30 to about 500,000 scf/min, and wherein the additional features have not previously been stimulated.

3. The method of claim 1, wherein the gas comprises one or more of: Nitrogen, Hydrogen, Methane, Ethane, Propane, Butane, Carbon Dioxide, or an inert gas, wherein the pressurized features are lower stress zones of the subterranean formation, and wherein the additional features are higher stress zones of the subterranean formation.

4. The method of claim 1, wherein the gas is in a gas phase upon introduction into the wellbore, wherein a volume of the gas introduced into the wellbore in (a) ranges from about 1,000 to about 100,000,000 scf, wherein the carrier fluid is substantially incompressible, and wherein the diverting composition is substantially compressible.

5. The method of claim 4, wherein the gas injection rate into the wellbore ranges from about 10,000 to about 20,000 scf/min.

6. The method of claim 1, wherein the diverting composition infiltrates and occupies pore volumes of the subterranean formation in a far afield area of the subterranean formation to a distance of about 10 to about 3000 feet from the wellbore.

7. The method of claim 1, wherein the wellbore is a horizontal well.

8. The method of claim 1, wherein the wellbore is a vertical well.

9. The method of claim 1, where in the wellbore is a deviated well.

10. A method of treating a subterranean formation, the method comprising:
   a) introducing a diverting composition consisting of a gas into a wellbore and into fractures or pore volumes of the subterranean formation extending from the wellbore; and
   b) thereafter introducing a carrier fluid into the subterranean formation, the gas being sufficiently pressurized within the fractures or pore volumes to cause the carrier fluid to pressurize and fracture additional fractures or pore volumes within the subterranean formation.

11. The method of claim 10, wherein the gas comprises an inert gas, wherein the gas pressurized fractures or pore volumes are previously stimulated areas, and wherein the additional fractures or pore volumes have not previously been stimulated.

12. The method of claim 10, wherein the gas comprises one or more of: Nitrogen, Hydrogen, Methane, Ethane, Propane, Butane, Carbon Dioxide, or an inert gas, wherein the gas pressurized features are lower stress zones of the subterranean formation, and wherein the additional features are higher stress zones of the subterranean formation.

13. The method of claim 10, wherein a volume of the gas introduced into the wellbore in (a) ranges from about 1,000 to about 100,000,000 scf, wherein the carrier fluid is substantially incompressible, wherein the diverting composition is substantially compressible, and wherein an injection rate of the gas into the wellbore in (a) ranges from about 30 to about 500,000 scf/min.

14. The method of claim 10, wherein the gas injection rate into the wellbore ranges from about 10,000 to about 20,000 scf/min.

15. The method of claim 10, wherein the gas remains in the subterranean formation for a chosen dwell time prior to the introduction of the carrier fluid.

16. The method of claim 10, wherein the wellbore is a horizontal well.

17. The method of claim 10, wherein the wellbore is a vertical well.

18. The method of claim 10, wherein the wellbore is a deviated well and wherein the diverting composition infiltrates and occupies pore volumes of the subterranean formation in a far afield area of the subterranean formation to a distance of about 10 to about 3000 feet from the wellbore.

19. The method of claim 10, wherein the diverting composition infiltrates and occupies pore volumes of the subterranean formation in a far afield area of the subterranean formation to a distance of about 10 to about 3000 feet from the wellbore.

20. The method of claim 10, wherein the diverting composition infiltrates and occupies pore volumes of the subterranean formation in a far afield area of the subterranean formation to a distance of about 10 to about 3000 feet from the wellbore.

21. The method of claim 10, wherein the gas is in a gas phase upon introduction into the wellbore.

22. The method of claim 10, wherein the wellbore is a deviated well.

* * * * *